(12) United States Patent
Saito et al.

(10) Patent No.: US 11,197,284 B2
(45) Date of Patent: Dec. 7, 2021

(54) USER TERMINAL AND CHANNEL ESTIMATION METHOD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 16/622,765

(22) PCT Filed: Jun. 15, 2017

(86) PCT No.: PCT/JP2017/022225
§ 371 (c)(1),
(2) Date: Dec. 13, 2019

(87) PCT Pub. No.: WO2018/229955
PCT Pub. Date: Dec. 20, 2018

(65) Prior Publication Data
US 2021/0153171 A1 May 20, 2021

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01); *H04L 5/0053* (2013.01)

(58) Field of Classification Search
CPC ... H04L 5/0048; H04L 5/0053; H04W 72/042
See application file for complete search history.

(56) References Cited

U.S. PATENT DOCUMENTS

| 2015/0180625 A1* | 6/2015 | Park ................ H04W 72/042 370/329 |
| 2015/0244439 A1 | 8/2015 | Nam et al. |
| 2015/0373677 A1* | 12/2015 | Seo ................ H04W 72/044 370/330 |
| 2016/0037491 A1* | 2/2016 | Hwang ................ H04L 1/1607 370/330 |

(Continued)

FOREIGN PATENT DOCUMENTS

| JP | 2015-073291 A | 4/2015 |
| JP | 2015-073327 A | 4/2015 |

(Continued)

OTHER PUBLICATIONS

International Search Report issued in corresponding International Application No. PCT/JP2017/022225 dated Aug. 15, 2017, with translation (7 pages).

(Continued)

*Primary Examiner* — Chi Ho A Lee
(74) *Attorney, Agent, or Firm* — Osha Bergman Watanabe & Burton LLP

(57) ABSTRACT

A terminal is disclosed including a receiver that receives downlink control information (DCI) including information indicating a mapping pattern of a demodulation reference signal, and a processor that controls reception of the demodulation reference signal based on the information indicating the mapping pattern of the demodulation reference signal. In other aspects, another terminal and a radio communication method are also disclosed.

7 Claims, 10 Drawing Sheets

(56) References Cited

U.S. PATENT DOCUMENTS

| | | | |
|---|---|---|---|
| 2016/0087709 A1* | 3/2016 | Horiuchi | H04B 7/068 375/260 |
| 2016/0112994 A1 | 4/2016 | Wang et al. | |
| 2017/0272141 A1* | 9/2017 | Horiuchi | H04L 5/0051 |
| 2018/0241508 A1* | 8/2018 | Chervyakov | H04L 27/2675 |
| 2019/0268089 A1* | 8/2019 | Fu | H04L 5/0051 |
| 2020/0204335 A1* | 6/2020 | Kim | H04L 27/261 |

FOREIGN PATENT DOCUMENTS

| | | |
|---|---|---|
| JP | 2016/518758 A | 6/2016 |
| WO | 2014/126519 A1 | 8/2014 |

OTHER PUBLICATIONS

Written Opinion of the International Searching Authority issued in corresponding International Application No. PCT/JP2017/022225 dated Aug. 15, 2017 (4 pages).

3GPP TS 36.300 V13.4.0 (Jun. 2016) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); Jun. 2016 (310 pages).

Office Action issued in the counterpart Japanese Patent Application No. 2019-524678, dated Jul. 21, 2020 (11 pages).

Huawei, HiSilicon; "Design of DL DMRS for data transmission"; 3GPP TSG RAN WG1 Meeting #89, R1-1706933; Hangzhou, China; May 15-19, 2017 (8 pages).

CATT; "Discussion on DMRS design for DL"; 3GPP TSG RAN WG1 Meeting #89, R1-1709165; Hangzhou, China; May 15-19, 2017 (11 pages).

NTT DOCOMO, Inc.; "Views on DM-RS"; 3GPP TSG RAN WG1 Meeting #89, R1-1708459; Hangzhou, P.R. China; May 15-19, 2017 (7 pages).

Motorola; "Remaining details on OCC and CS mapping for UL DM-RS"; 3GPP TSG RAN WG1 Meeting #62bis, R1-105629; Xi'an, China; Oct. 11-15, 2010 (6 pages).

CATT; "Discussion on DMRS design for UL"; 3GPP TSG RAN WG1 Meeting #88bis, R1-1707488; Hangzhou, China; May 15-19, 2017 (8 pages).

Office Action issued in the counterpart Japanese Patent Application No. 2019-524678, dated Dec. 1, 2020 (9 pages).

Extended European Search Report issued in counterpart European Patent Application No. 17913414.3, dated Dec. 4, 2020 (10 pages).

Reconsideration Report by the Examiner before Appeal in counterpart Japanese Patent Application No. 2019-524678 dated Apr. 6, 2021 (9 pages).

\* cited by examiner

USER TERMINAL AND CHANNEL ESTIMATION METHOD

TECHNICAL FIELD

The present invention relates to a user terminal and a channel estimation method.

BACKGROUND ART

Long Term Evolution (LTE) has been specified for achieving a higher data rate, lower latency, and/or the like in a Universal Mobile Telecommunication System (UMTS) network (NPL 1). Further, future systems of LTE have been also studied for achieving a broader bandwidth and higher speed based on the LTE. Examples of the future systems of the LTE include, for example, systems called LTE-Advanced (LTE-A), Future Radio Access (FRA), 5th generation mobile communication system (5G), 5G plus (5G+) and New Radio Access Technology (New-RAT).

The future radio communication systems (for example, 5G) are expected to support a broad range of frequencies ranging from a low carrier frequency to a high carrier frequency. For example, the future radio communication systems are desired to flexibly support arrangement (mapping) of reference signals, and/or the like, since propagation channel environments (for example, communication quality and frequency selectivity) and/or requirements (moving speed of a terminal to be supported, and/or the like) greatly differ for each frequency band such as a low carrier frequency and a high carrier frequency.

For example, in the future radio communication systems, switching of a mapping pattern among a plurality of mapping patterns in which positions and/or the number of reference signals are different is being studied.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-U IRAN); Overall description; Stage 2 (Release 13)," June 2016

SUMMARY OF INVENTION

Technical Problem

However, in the case where a mapping pattern indicating arrangement of reference signals which are to be transmitted by one radio communication apparatus (for example, a radio base station (gNB)) to the other radio communication apparatus (for example, a user terminal (UE)) is switched among a plurality of mapping pattern, variance occurs between mapping patterns assumed by the two radio communication apparatuses. As a result, because the radio communication apparatus (for example, the user terminal (UE)) which receives the reference signals cannot appropriately receive the transmitted reference signals, there is a possibility that channel estimation accuracy may deteriorate.

The present invention has been made in view of such points, and an object of the present invention is to provide a user terminal and a channel estimation method which can appropriately receive reference signals and which can avoid deterioration of channel estimation accuracy.

Solution to Problem

A user terminal according to an aspect of the present invention includes: a receiver that receives a downlink signal including a demodulation reference signal; a controller that separates the demodulation reference signal from the downlink signal; and a channel estimator that calculates a channel estimation value, using the demodulation reference signal, in which: the receiver receives allocation information indicating a port allocated to the user terminal among a plurality of ports, and receives pattern information indicating a mapping pattern selected from a first mapping pattern specifying a resource element in which the demodulation reference signal is arranged in each of the plurality of ports and a second mapping pattern included in the first mapping pattern, and the controller separates the demodulation reference signal in the port allocated to the user terminal from the downlink signal on a basis of the mapping pattern indicated by the pattern information.

Advantageous Effects of Invention

According to an aspect of the present invention, it is possible to appropriately receive reference signals and suppress deterioration of channel estimation accuracy.

DESCRIPTION OF EMBODIMENTS

Hereinafter, each embodiment of the present invention will be described in detail with reference to the accompanying drawings.

One Embodiment

Figure 1:
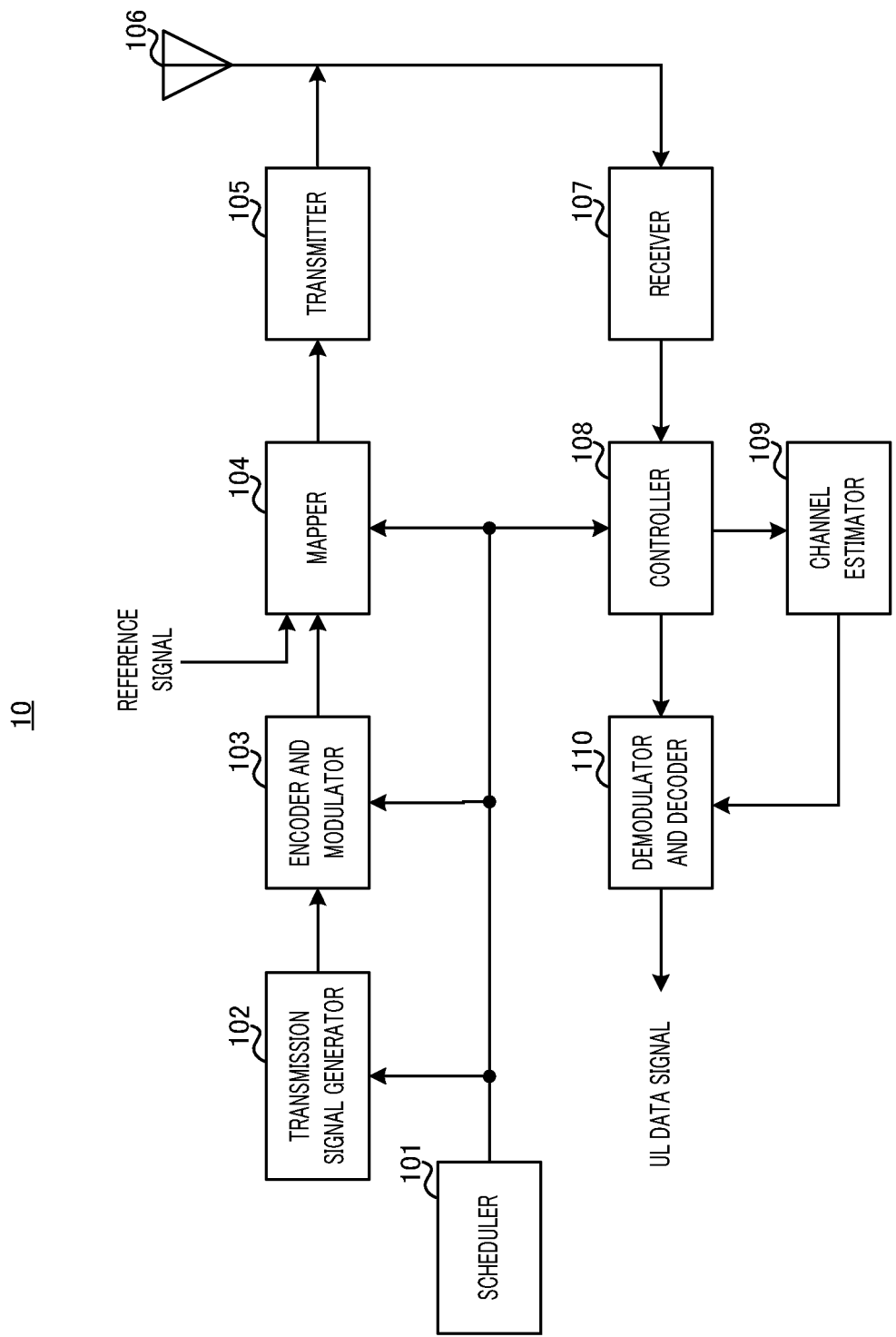
FIG. 1 is a block diagram illustrating an example of an entire configuration of a radio base station according to one embodiment of the present invention.
Figure 2:
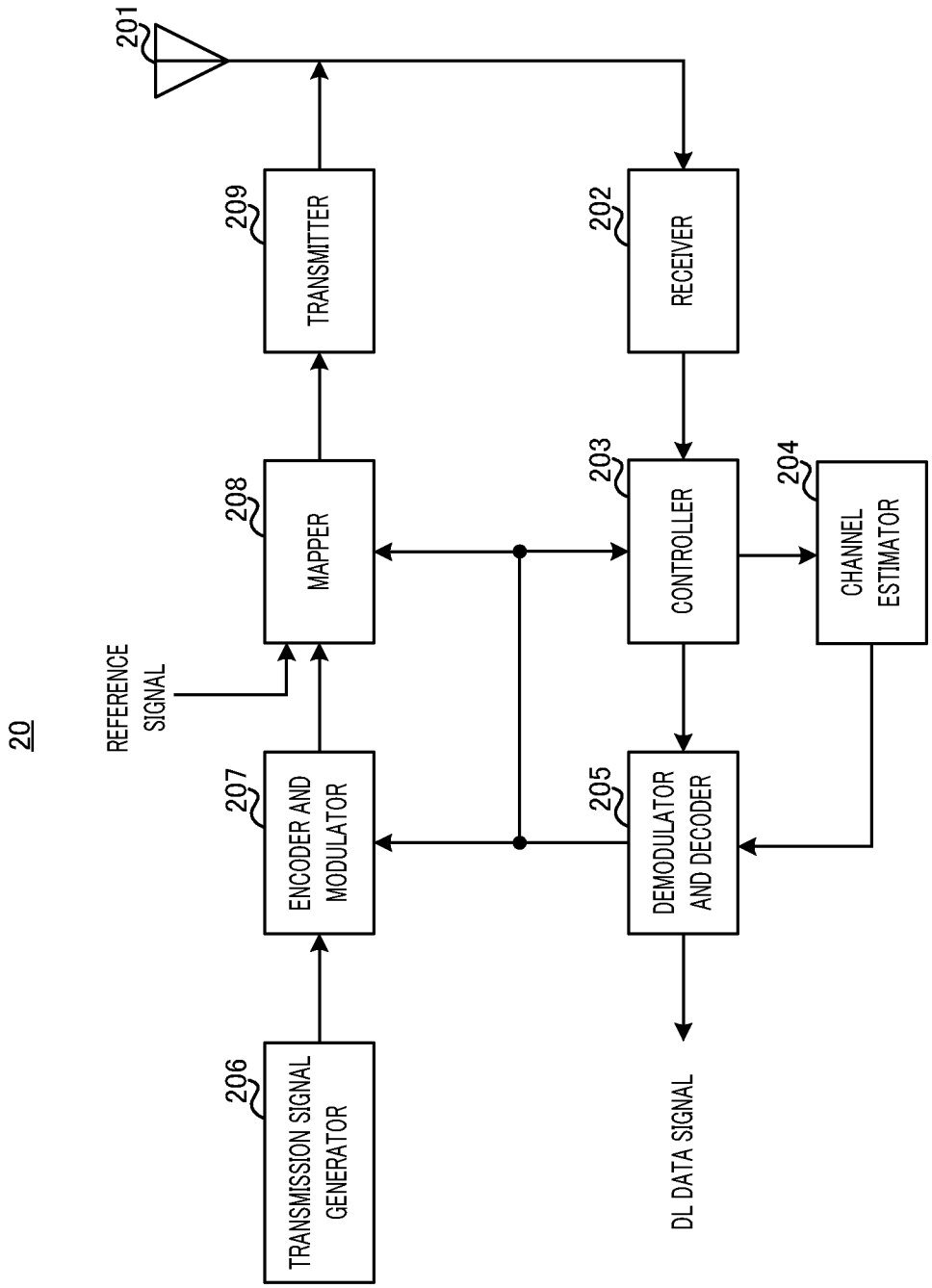
FIG. 2 is a block diagram illustrating an example of an entire configuration of a user terminal according to one embodiment of the present invention.

A radio communication system according to the present embodiment includes at least radio base station 10 (also referred to as gNodeB (gNB), for example) as illustrated in FIG. 1, and user terminal 20 (also referred to as User Equipment (UE), for example) as illustrated in FIG. 2. User terminal 20 is connected to radio base station 10.

Radio base station 10 transmits a downlink (DL) control signal to user terminal 20 using a downlink control channel (for example, Physical Downlink Control Channel (PDCCH)) and transmits a DL data signal and a demodulation reference signal (hereinafter, a DMRS) for demodulating the DL data signal using a downlink data channel (for example, Physical Downlink Shared Channel (PDSCH)). Further, user terminal 20 transmits an uplink (UL) control signal to radio base station 10 using an uplink control channel (for example, Physical Uplink Control Channel (PUCCH)) or an uplink data channel (for example, Physical Uplink Shared Channel (PUSCH)) and transmits an UL data signal and a DMRS using an uplink data channel (for example, Physical Uplink Shared Channel (PUSCH).

Note that, the downlink channel and the uplink channel through which radio base station 10 and user terminal 20 perform transmission and reception are not limited to the aforementioned PDCCH, PDSCH, PUCCH, PUSCH, and/or the like, and may be other channels such as, for example, a Physical Broadcast Channel (PBCH) and a Random Access Channel (RACH).

Additionally, in FIGS. 1 and 2, a signal waveform of the DL/UL signal generated at radio base station 10 and user terminal 20 may be a signal waveform based on Orthogonal Frequency Division Multiplexing (OFDM) modulation, or a signal waveform based on Single Carrier-Frequency Division Multiple Access (SC-FDMA) or DFT-Spread-OFDM (DFT-S-OFDM), or other signal waveforms. Illustration of component sections for generating a signal waveform (for example, an IFFT processor, a CP adder, a CP remover, an FFT processor, and/or the like) are omitted in FIGS. 1 and 2.

<Radio Base Station>

FIG. 1 is a block diagram illustrating an example of an entire configuration of radio base station 10 according to the present embodiment. Radio base station 10 illustrated in FIG. 1 includes scheduler 101, transmission signal generator 102, encoder and modulator 103, mapper 104, transmitter 105, antenna 106, receiver 107, controller 108, channel estimator 109, and demodulator and decoder 110. Note that, radio base station 10 may have a configuration for Multi-User Multiple-Input Multiple-Output (MU-MIMO) in which radio base station 10 simultaneously communicates with a plurality of user terminals 20 or may have a configuration for Single-User Multiple-Input Multiple-Output (SU-MIMO) in which radio base station 10 communicates with a single user terminal 20.

Scheduler 101 performs scheduling (for example, resource allocation) of a DL signal (a DL data signal, a DL control signal, a DMRS, and/or the like). In addition, scheduler 101 performs scheduling (for example, resource allocation and layer (port) allocation) of an UL signal (an UL data signal, an UL control signal, a DMRS, or the like). The port means a mapping pattern of the DMRS logically allocated for each user terminal 20 in a plurality of layers. Note that, while description will be provided in the present embodiment assuming that ports correspond to layers on a one-to-one basis, the present invention is not limited to this. The port and/or the layer may be defined with different terms.

In scheduling, scheduler 101 configures a layer (port number) to be allocated to each user terminal 20.

Further, in scheduling, scheduler 101 prepares in advance a plurality of mapping patterns indicating resource elements on which the DMRS of a DL signal is to be mapped, and, for example, selects one mapping pattern by switching the mapping pattern among the plurality of mapping patterns on the basis of the number of multiplexing of user terminal 20 and a layer (port number) to be allocated to each user terminal 20. The prepared plurality of mapping patterns have arrangement of the DMRS which is partly different from each other. Further, the mapping pattern specifies resource elements on which the DMRS is to be mapped over a plurality of layers.

Each user terminal 20 may be notified of information (allocation information) indicating a port number allocated to each user terminal 20 and information (pattern information) indicating the selected mapping pattern through higher layer (for example, Radio Resource Control (RRC) or Medium Access Control (MAC)) signaling, or each user terminal 20 may be notified through physical layer (PHY) signaling.

Further, signaling may be individually performed at each user terminal 20 or may be performed in specific units. For example, common signaling may be performed for each resource unit to be allocated, for each subband, for each Resource Block Group (RBG), for each Component Carrier (CC), for each cell or for each carrier frequency.

Further, signaling may be periodically executed or may be dynamically executed.

Scheduler 101 outputs scheduling information including the allocation information and/or the pattern information to transmission signal generator 102 and mapper 104.

Specific examples of the mapping pattern and specific examples of the pattern information at scheduler 101 will be described later.

Further, scheduler 101, for example, configures a Modulation and Coding Scheme (MCS) (such as a coding rate and a modulation scheme) of a DL data signal and an UL data signal on the basis of channel quality between radio base station 10 and user terminal 20 and outputs MCS information to transmission signal generator 102 and encoder and modulator 103. Note that the MCS is not limited to one configured by radio base station 10, and may be configured by user terminal 20. In the case where user terminal 20 configures the MCS, radio base station 10 may receive the MCS information from user terminal 20 (not illustrated).

Transmission signal generator 102 generates a transmission signal (including the DL data signal and the DL control signal). For example, the DL control signal includes the scheduling information (for example, resource allocation information on the DL data signal) or Downlink Control Information (DCI) including the MCS information output from scheduler 101. Transmission signal generator 102 outputs the generated transmission signal to encoder and modulator 103.

Encoder and modulator 103, for example, performs encoding processing and modulation processing on the transmission signal input from transmission signal generator 102 on the basis of the MCS information input from scheduler 101. Encoder and modulator 103 outputs the modulated transmission signal to mapper 104.

Mapper 104 maps the transmission signal input from encoder and modulator 103 to a predetermined radio resource (DL resource) on the basis of the scheduling information (for example, DL resource allocation, a port number allocated to each user terminal 20 and a mapping pattern of the DMRS) input from scheduler 101. Further, mapper 104 maps a reference signal (for example, the DMRS) to a predetermined radio resource (DL resource) on the basis of the scheduling information. Mapper 104 outputs the DL signal mapped to the radio resource to transmitter 105.

Transmitter 105 performs transmission processing such as up-conversion and amplification on the DL signal input from mapper 104 and transmits a radio frequency signal (DL signal) from antenna 106.

Receiver 107 performs reception processing such as amplification and down-conversion on the radio frequency signal (UL signal) received at antenna 106 and outputs the UL signal to controller 108.

Controller 108 separates (de-maps) the UL data signal and the DMRS from the UL signal input from receiver 107 on the basis of the scheduling information (UL resource allocation) input from scheduler 101. Then, controller 108 outputs the UL data signal to demodulator and decoder 110 and outputs the DMRS to channel estimator 109.

Channel estimator 109 performs channel estimation using the DMRS of the UL signal and outputs a channel estimation value which is an estimation result to demodulator and decoder 110.

Demodulator and decoder 110 performs demodulation and decoding processing on the UL data signal input from controller 108 on the basis of the channel estimation value input from channel estimator 109. Demodulator and decoder 110 transfers the demodulated UL data signal to an application section (not illustrated). Note that the application section performs processing, and/or the like, relating to layers higher than a physical layer or a MAC layer.

<User Terminal>

FIG. 2 is a block diagram illustrating an example of an entire configuration of user terminal 20 according to the present embodiment. User terminal 20 illustrated in FIG. 2 includes antenna 201, receiver 202, controller 203, channel estimator 204, demodulator and decoder 205, transmission signal generator 206, encoder and modulator 207, mapper 208 and transmitter 209.

Receiver 202 performs reception processing such as amplification and down-conversion on the radio frequency signal (DL signal) received at antenna 201 and outputs the DL signal to controller 203. The DL signal includes at least the DL data signal and the DMRS.

Controller 203 separates (de-maps) the DL control signal and the DMRS from the DL signal input from receiver 202. Then, controller 203 outputs the DL control signal to demodulator and decoder 205 and outputs the DMRS to channel estimator 204.

At this time, controller 203 controls reception of the DMRS in allocated layers (port numbers) indicated by the allocation information on the basis of the mapping pattern indicated by the pattern information which is notified to user terminal 20 in advance.

Further, controller 203 separates (de-maps) the DL data signal from the DL signal on the basis of the scheduling information (for example, DL resource allocation information) input from demodulator and decoder 205 and outputs the DL data signal to demodulator and decoder 205.

Channel estimator 204 performs channel estimation using the separated DMRS and outputs a channel estimation value which is an estimation result to demodulator and decoder 205.

Demodulator and decoder 205 demodulates the DL control signal input from controller 203. Further, demodulator and decoder 205 performs decoding processing (for example, blind detection processing) on the demodulated DL control signal. Demodulator and decoder 205 outputs the scheduling information (DL/UL resource allocation) which is addressed to the own apparatus and which is obtained by decoding the DL control signal, to controller 203 and mapper 208 and outputs the MCS information for the UL data signal to encoder and modulator 207.

Further, demodulator and decoder 205 performs demodulation and decoding processing on the DL data signal input from controller 203 using the channel estimation value input from channel estimator 204 on the basis of the MCS information for the DL data signal included in the DL control signal input from controller 203. Further, demodulator and decoder 205 transfers the demodulated DL data signal to an application section (not illustrated). Note that the application section performs processing, and/or the like, relating to layers higher than the physical layer or the MAC layer.

Transmission signal generator 206 generates a transmission signal (including the UL data signal or the UL control signal) and outputs the generated transmission signal to encoder and modulator 207.

Encoder and modulator 207, for example, performs encoding processing and modulation processing on the transmission signal input from transmission signal generator 206 on the basis of the MCS information input from demodulator and decoder 205. Encoder and modulator 207 outputs the modulated transmission signal to mapper 208.

Mapper 208 maps the transmission signal input from encoder and modulator 207 to a predetermined radio resource (UL resource) on the basis of the scheduling information (UL resource allocation) input from demodulator and decoder 205. Further, mapper 208 maps a reference signal (for example, the DMRS) to a predetermined radio resource (UL resource) on the basis of the scheduling information (for example, a mapping configuration including a user pattern of the DMRS).

Transmitter 209 performs transmission processing such as up-conversion and amplification on the UL signal (including at least the UL data signal and the DMRS) input from mapper 208 and transmits the radio frequency signal (UL signal) from antenna 201.

Specific examples of the mapping pattern and specific examples of the pattern information will be described next.

First, as a first example, examples of a mapping pattern of the DMRS in eight layers and a mapping pattern of the DMRS in four layers will be described.

Note that, in the following description, to distinguish among a plurality of user terminals 20, user terminal 20 will be described as user terminal #1, user terminal #2, and/or the like, and, to distinguish among user patterns configured for each user terminal 20, the user patterns will be described as user patterns #1, #2, and/or the like.

First Example

Figure 3:
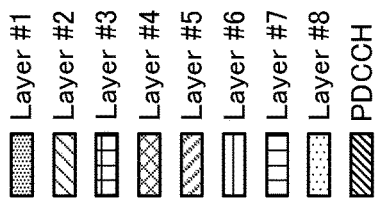
FIG. 3 illustrates mapping patterns in a first example.
Figure 3:
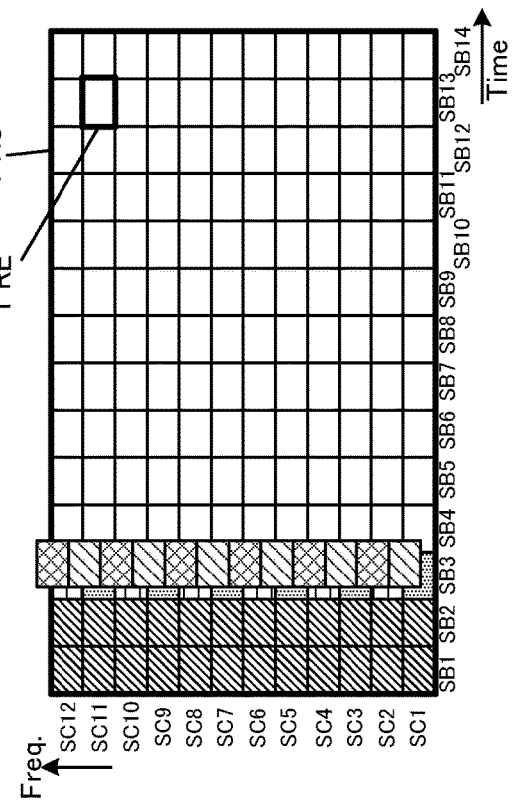
Figure 3:
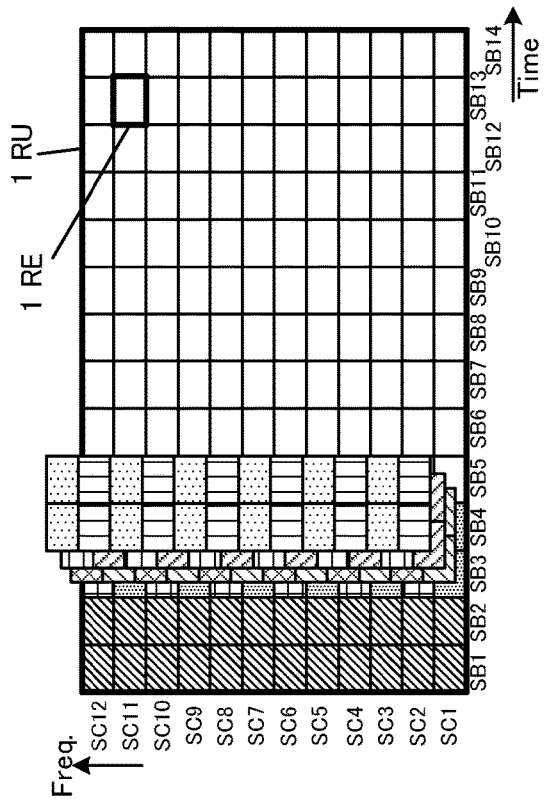

FIG. 3 illustrates mapping patterns in a first example. FIG. 3 illustrates mapping pattern #1 of the DMRS in eight layers and mapping pattern #2 of the DMRS in four layers. Each mapping pattern indicates mapping positions of the DMRS in each layer in a Resource Unit (RU) (which is also referred to as a resource block, a resource block pair, and/or the like) which becomes a resource allocation unit.

The RU has a configuration in which 168 Resource Elements (REs) are arranged such that 14 REs are arranged in a time direction and 12 REs are arranged in a frequency direction. 1 RE is a radio resource region defined with one symbol and one subcarrier. That is, one RU is configured with 14 symbols and 12 subcarriers.

Note that, in the following description, 14 symbols in the time direction of the RU will be referred to as SB 1 to SB 14 starting from the left. Further, 12 subcarriers in the frequency direction of the RU will be referred to as SC 1 to SC 12 starting from the bottom.

In the REs of first two symbols (that is, SB 1 and SB 2) of the RU, a control signal channel (for example, a PDCCH) is arranged.

Mapping pattern #1 is a pattern in which the DMRS in eight layers of layer #1 to layer #8 is arranged in two successive symbols (SB 3 and SB 4). Mapping pattern #2 is a pattern in which the DMRS in four layers of layer #1 to layer #4 is arranged in one symbol (SB 3).

In mapping pattern #1, the DMRS in different layers which is arranged in the same REs (for example, the DMRS in layer #1, layer #2, layer #5 and layer #7 arranged in SB 3 and SB 4 of SC 1) is multiplexed by, for example, Repetition or TD-OCC (multiplexing by Orthogonal Cover Code (OCC) sequence in a time direction).

Arrangement of the DMRS in layer #1 to layer #4 in SB 3 in mapping pattern #2 is similar to arrangement of the DMRS in layer #1 to layer #4 in SB 3 in mapping pattern #1. That is, arrangement in mapping pattern #2 is configured from part of arrangement in mapping pattern #1, and arrangement in mapping pattern #1 includes arrangement in mapping pattern #2.

Radio base station 10 allocates layers (port numbers) to each user terminal 20, selects one of mapping pattern #1 and mapping pattern #2, and transmits a downlink signal including the DMRS in the layers (port numbers) allocated to each user terminal 20 on the basis of the selected mapping pattern.

Here, an example where radio base station 10 allocates layer #1 and layer #2 (port #1 and port #2) and layer #3 to layer #6 (port #3 to port #6) to each of the plurality of user terminals 20 (for example, user terminals #1 and #2) will be described.

Figure 4:
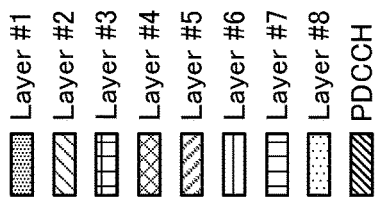
FIG. 4 illustrates arrangement of a DMRS in layer #1 and layer #2 in respective mapping patterns in FIG. 3.
Figure 4:
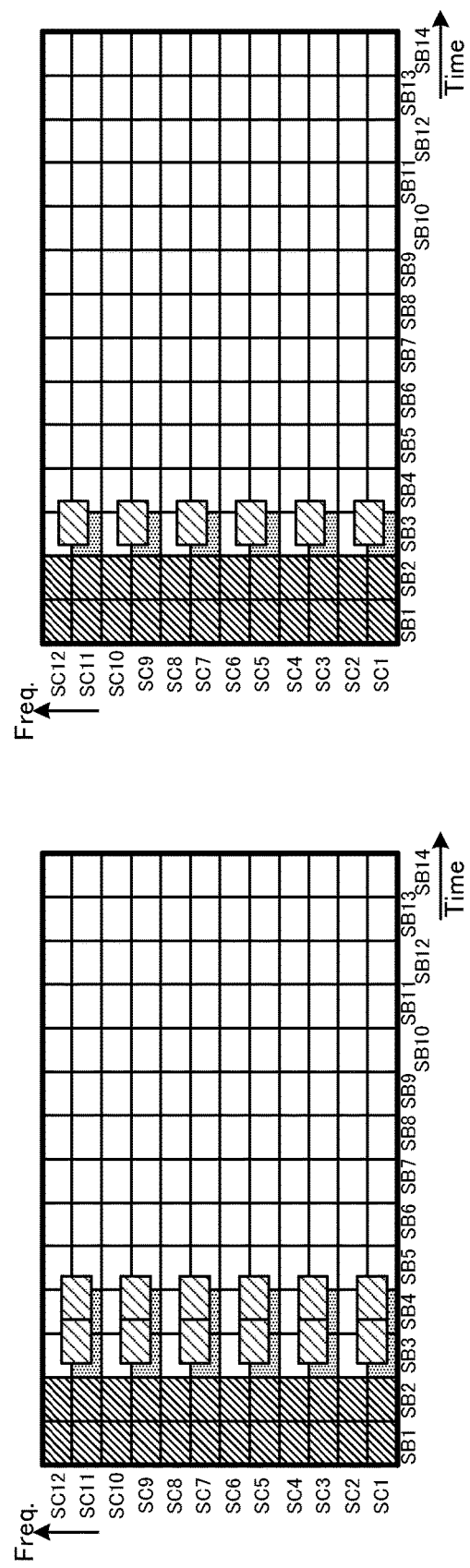

FIG. 4 illustrates arrangement of the DMRS in layer #1 and layer #2 in respective mapping patterns in FIG. 3.

Radio base station 10 allocates layer #1 and layer #2 (port #1 and port #2) to user terminal #1, makes a notification of information on the allocated port numbers to user terminal #1, allocates layer #3 to layer #6 (port #3 to port #6) to user terminal #2 and makes a notification of information on the allocated port numbers to user terminal #2.

For example, in the case where a mapping pattern to be applied is uniquely determined in accordance with the number of transmission layers such that, upon transmission in one to four layers, mapping pattern #2 is applied, and upon transmission in five to eight layers, mapping pattern #1 is applied, radio base station 10 configures mapping pattern #1 in FIG. 3 as the mapping pattern to be applied, and transmits the DMRS addressed to each user terminal 20. Meanwhile, user terminal #1 which is notified of only information on the port number allocated to the own terminal recognizes that the mapping pattern to be applied by radio base station 10 is mapping pattern #2 in FIG. 3. Therefore, while the pattern of the DMRS to be transmitted by radio base station 10 to user terminal #1 is DMRS pattern #1 in FIG. 4, user terminal #1 which receives only a notification of the information on the port number allocated by radio base station 10 separates the DMRS and performs channel estimation on the basis of the DMRS pattern #2 in FIG. 4.

That is, in such a case, there occurs variance between the mapping pattern of the DMRS transmitted by radio base station 10 and the mapping pattern assumed (recognized) by user terminal #1. As a result, because user terminal #1 cannot appropriately receive the DMRS transmitted by radio base station 10, channel estimation accuracy based on a reception result of the DMRS deteriorates.

To avoid such deterioration of the channel estimation accuracy, radio base station 10 notifies each user terminal 20 including user terminal #1 of the pattern information.

First to third variations of the pattern information will be described below.

<First Variation of Pattern Information>

In the first variation, radio base station 10 notifies each user terminal 20 of the total number of DMRS transmission ports (the total number of transmission layers) as the pattern information.

For example, in the case where the total number of transmission ports with which radio base station 10 performs transmission is eight, radio base station 10 makes a notification that the total number of DMRS transmission ports is "8" as the pattern information.

When user terminal 20 receives the total number of DMRS transmission ports of "8" as the pattern information, user terminal 20 recognizes that the mapping pattern applied by radio base station 10 is switched to mapping pattern #1. Then, user terminal 20 receives the DMRS transmitted by radio base station 10 and performs channel estimation based on a reception result of the DMRS, on the basis of mapping pattern #1 and information on the transmission port numbers allocated to user terminal 20, which has been already notified.

For example, an example will be described where, in 4UE-MIMO in which transmission in eight layers is performed to four user terminals (user terminal #1 to user terminal #4) as in mapping pattern #1 in FIG. 3, radio base station 10 allocates layer #1 and layer #2 (DMRS port numbers #1 and #2) to user terminal #1, allocates layer #3 and layer #4 (DMRS port numbers #3 and #4) to user terminal #2, allocates layer #5 and layer #6 (DMRS port numbers #5 and #6) to user terminal #3, and allocates layer #7 and layer #8 (DMRS port numbers #7 and #8) to user terminal #4.

In this case, radio base station 10 notifies user terminal #1 of DMRS transmission port numbers #1 and #2 as the allocation information and of the total number of DMRS transmission ports of "8" as the pattern information. In a similar manner, radio base station 10 notifies user terminal #2 of DMRS transmission port numbers #3 and #4 as the allocation information and of the total number of DMRS transmission ports of "8" as the pattern information. Radio base station 10 notifies user terminal #3 of DMRS transmission port numbers #5 and #6 as the allocation information and of the total number of DMRS transmission ports of "8" as the pattern information. Radio base station 10 notifies user terminal #4 of DMRS transmission port numbers #7 and #8 as the allocation information and of the total number of DMRS transmission ports of "8" as the pattern information.

<Second Variation of Pattern Information>

In the second variation, radio base station 10 notifies each user terminal 20 of the number of transmission symbols of the DMRS in the mapping pattern as the pattern information.

For example, in the case where the total number of DMRS transmission ports with which radio base station 10 performs transmission is eight, and mapping pattern #1 is applied, radio base station 10 makes a notification of the number of transmission symbols of the DMRS of "2" in mapping pattern #1 as the pattern information.

When user terminal 20 receives the number of transmission symbols of the DMRS of "2" as the pattern information, user terminal 20 recognizes that the mapping pattern applied by radio base station 10 is switched to mapping pattern #1. Then, user terminal 20 receives the DMRS transmitted by radio base station 10 and performs channel estimation based on a reception result of the DMRS, on the basis of mapping pattern #1 and information on the transmission port numbers allocated to user terminal 20, which has already been notified.

For example, an example will be described where, in 4UE MU-MIMO in which transmission in eight layers is performed to four user terminals (user terminal #1 to user terminal #4) as in mapping pattern #1 in FIG. 3, radio base station 10 allocates layer #1 and layer #2 (DMRS port numbers #1 and #2) to user terminal #1, allocates layer #3 and layer #4 (DMRS port numbers #3 and #4) to user terminal #2, allocates layer #5 and layer #6 (DMRS port numbers #5 and #6) to user terminal #3, and allocates layer #7 and layer #8 (DMRS port numbers #7 and #8) to user terminal #4.

In this case, radio base station 10 notifies user terminal #1 of DMRS transmission port numbers #1 and #2 as the allocation information and of the number of transmission symbols of the DMRS of "2" as the pattern information. In a similar manner, radio base station 10 notifies user terminal #2 of DMRS transmission port numbers #3 and #4 as the allocation information and of the number of transmission symbols of the DMRS of "2" as the pattern information. Radio base station 10 notifies user terminal #3 of DMRS transmission port numbers #5 and #6 as the allocation information and of the number of transmission symbols of the DMRS of "2" as the pattern information. Radio base station 10 notifies user terminal #4 of DMRS transmission port numbers #7 and #8 as the allocation information and of the number of transmission symbols of the DMRS of "2" as the pattern information.

<Third Variation of Pattern Information>

In the third variation, radio base station 10 notifies each user terminal 20 of an index value indicating the mapping pattern as the pattern information.

For example, in the case where radio base station 10 applies mapping pattern #1 which supports transmission in five to eight layers, radio base station 10 makes a notification of an index value of "1" corresponding to mapping pattern #1 as the pattern information. Meanwhile, in the case where radio base station 10 switches the mapping pattern to mapping pattern #2 which supports transmission in one to four layers, radio base station 10 makes a notification of an index value of "0" corresponding to mapping pattern #2 as the pattern information.

In the case where user terminal 20 receives the index value of "1" as the pattern information, user terminal 20 recognizes that the mapping pattern applied by radio base station 10 is mapping pattern #1. Then, user terminal 20 receives the DMRS transmitted by radio base station 10 and performs channel estimation based on a reception result of the DMRS, on the basis of mapping pattern #1 and information on the transmission port numbers allocated to user terminal 20, which has already been notified.

For example, an example will be described where, in 4UE-MIMO in which transmission in eight layers is performed to four user terminals (user terminal #1 to user terminal #4) as in mapping pattern #1 in FIG. 3, radio base station 10 allocates layer #1 and layer #2 (DMRS port numbers #1 and #2) to user terminal #1, allocates layer #3 and layer #4 (DMRS port numbers #3 and #4) to user terminal #2, allocates layer #5 and layer #6 (DMRS port numbers #5 and #6) to user terminal #3, and allocates layer #7 and layer #8 (DMRS port numbers #7 and #8) to user terminal #4.

In this case, radio base station 10 notifies user terminal #1 of DMRS port numbers #1 and #2 as the allocation information and of the index value of "1" as the pattern information. In a similar manner, radio base station 10 notifies user terminal #2 of DMRS port numbers #3 and #4 as the allocation information and of the index value of "1" as the pattern information. Radio base station 10 notifies user terminal #3 of DMRS port numbers #5 and #6 as the allocation information and of the index value of "1" as the pattern information. Radio base station 10 notifies user terminal #4 of DMRS port numbers #7 and #8 as the allocation information and of the index value of "1" as the pattern information.

In the first example and each variation of the pattern information in the first example described above, examples where the number of layers are different between two mapping patterns have been described. Subsequently, as a second example, examples of two mapping patterns of the DMRS in four layers will be described.

Second Example

Figure 5:
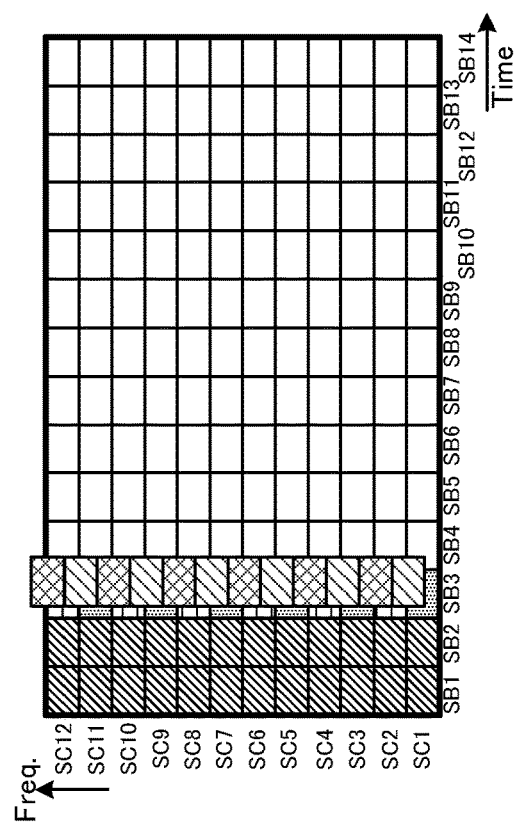
FIG. 5 illustrates mapping patterns in a second example.
Figure 5:
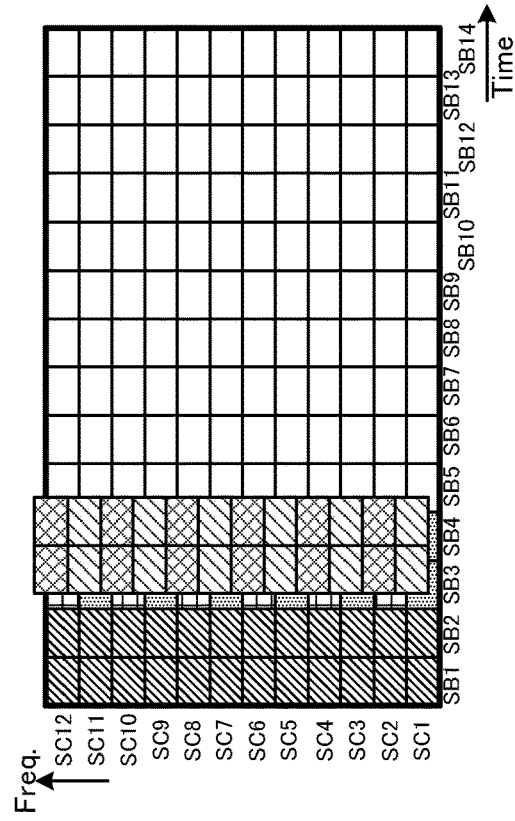

FIG. 5 illustrates mapping patterns in the second example. FIG. 5 illustrates mapping pattern #3 and mapping pattern #4 of the DMRS in four layers. Each mapping pattern indicates mapping positions of the DMRS in each layer in an RU which becomes a resource allocation unit.

In REs of first two symbols (that is, SB 1 and SB 2) of the RU, a control signal channel (for example, a PDCCH) is arranged.

Mapping pattern #3 is a pattern in which the DMRS in four layers of layer #1 to layer #4 is arranged in two successive symbols (SB 3 and SB 4). Mapping pattern #4 is a pattern in which the DMRS in four layers of layer #1 to layer #4 is arranged in one symbol (SB 3).

The DMRS in layers different in the time direction in mapping pattern #3 (for example, the DMRS in layer #1 and layer #2 arranged in SB 3 and SB 4 of SC 1) is multiplexed by, for example, Repetition or TD-OCC.

Arrangement of the DMRS in layer #1 to layer #4 in SB 3 in mapping pattern #4 is similar to arrangement of the DMRS in layer #1 to layer #4 in SB 3 in mapping pattern #3. That is, arrangement in mapping pattern #4 is configured from part of arrangement in mapping pattern #3, and arrangement in mapping pattern #3 includes arrangement in mapping pattern #4.

Radio base station 10 allocates layers (port numbers) to each user terminal 20, selects one of mapping pattern #1 and mapping pattern #2, and transmits a downlink signal including the DMRS in the layers (port numbers) allocated to each user terminal 20 on the basis of the selected mapping pattern.

Here, an example where radio base station 10 allocates layer #1 and layer #2 (port #1 and port #2) and layer #3 and layer #4 (port #3 and port #4) to each of the plurality of user terminals 20 (for example, user terminals #1 and #2) will be described.

Arrangement of the DMRS in layer #1 and layer #2 in mapping pattern #3 in FIG. 5 is similar to DMRS pattern #1 in FIG. 4, and arrangement of the DMRS in layer #1 and layer #2 in mapping pattern #4 in FIG. 5 is similar to DMRS pattern #2 in FIG. 4.

That is, as described in the first example, even in the case where one of the two mapping patterns in FIG. 5 in which the number of layers (the number of port numbers) is the same, is applied, there occurs variance between the mapping pattern of the DMRS transmitted by radio base station 10 and the mapping pattern assumed (recognized) by user terminal #1 (and/or user terminal #2). As a result, because user terminal #1 (and/or user terminal #2) cannot appropriately receive the DMRS transmitted by radio base station 10, channel estimation accuracy based on a reception result of the DMRS deteriorates.

To avoid such deterioration of the channel estimation accuracy, radio base station 10 notifies each user terminal 20 including user terminal #1 (and user terminal #2) of pattern information indicating the mapping pattern.

Because the pattern information notified in the second example is similar to that in the first example, detailed description will be omitted. However, in the second example, as illustrated in FIG. 5, because the total number of DMRS transmission ports is the same between the two mapping patterns to be applied, the first variation of the pattern information described in the first example is not used. The second variation and the third variation of the pattern information described in the first example are also used in the second example.

Note that, while, in the above-described example, MU-MIMO for two user terminals (user terminal #1 and user terminal #2) is described, the present invention can be also applied to SU-MIMO for one user terminal (user terminal #1).

For example, in the case where layer #1, layer #2, layer #3 and layer #4 (DMRS transmission port numbers #1 to #4) are allocated to user terminal #1, radio base station 10 notifies user terminal #1 of DMRS transmission port numbers #1 to #4 as the allocation information.

Then, in the case where radio base station 10 uses the above-described second variation as the pattern information, radio base station 10 makes a notification of one of "1" and "2" which is the number of transmission symbols of the DMRS in the mapping pattern to be applied in accordance with which of mapping pattern #3 and mapping pattern #4 is to be applied. Further, in the case where radio base station 10 uses the above-described third variation as the pattern information, radio base station 10 makes a notification of "0" or "1" which is an index value associated with the mapping pattern to be applied in accordance with which of mapping pattern #3 and mapping pattern #4 is to be applied.

Note that, while, in the above-described first example and second example, the mapping patterns in the RU having a configuration where 168 REs are arranged such that 14 REs are arranged in the time direction and 12 REs are arranged in the frequency direction have been described, the present invention is not limited to this. For example, the present invention can be also applied to mapping of the DMRS in which resources are allocated in units called mini-slots. An example of the mapping pattern of the DMRS in the case where resources are allocated in units of mini-slots will be described below.

<First Example in Mini-Slot>

Figure 6:
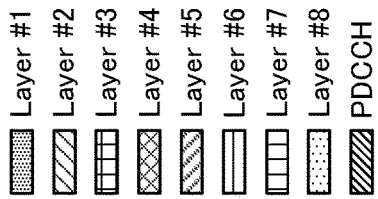
FIG. 6 illustrates mapping patterns in a mini-slot in a first example.
Figure 6:
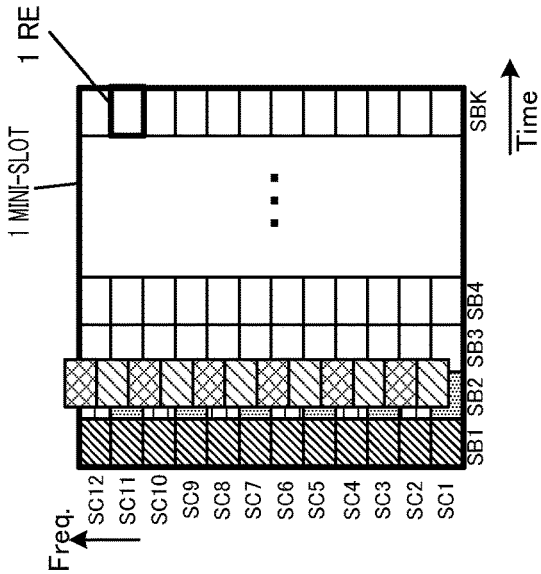
Figure 6:
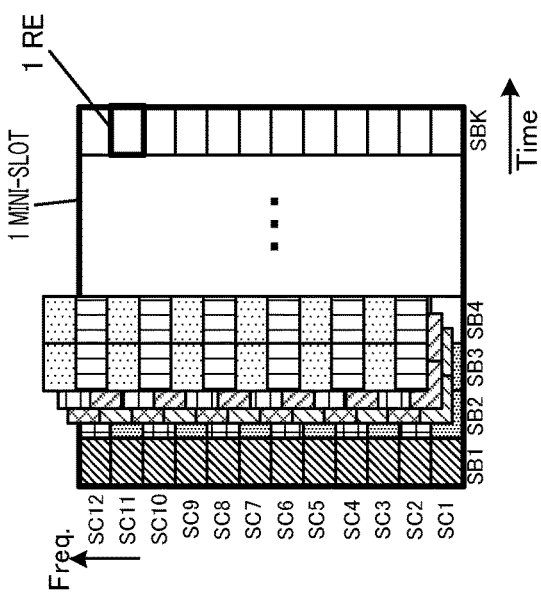

FIG. 6 illustrates mapping patterns in a mini-slot in a first example. FIG. 6 illustrates mapping pattern #A of the DMRS in eight layers, and mapping pattern #B of the DMRS in four layers. Each mapping pattern indicates mapping positions of the DMRS in each layer in a mini-slot which is a resource allocation unit.

The mini-slot in FIG. 6 has a configuration in which 12 REs are arranged in the frequency direction, and K REs (where K is an integer equal to or greater than 1 and equal to less than 14) are arranged in the time direction (part of the configuration is not illustrated).

In the RE in the first one symbol (that is, SB 1) in the mini-slot, a control signal channel (for example, a PDCCH) is arranged.

Mapping pattern #A is a pattern in which the DMRS in eight layers of layer #1 to layer #8 is arranged in two successive symbols (SB 2 and SB 3). Mapping pattern #B is a pattern in which the DMRS in four layers of layer #1 to layer #4 is arranged in one symbol (SB 2).

In mapping pattern #A and mapping pattern #B, the DMRS in the same layer is arranged at intervals corresponding to one subcarrier. This arrangement may be referred to as "Comb2" or "IFDM (RPF=2)".

In mapping pattern #A, the DMRS in different layers arranged in the same REs (for example, the DMRS in layer #1, layer #2, layer #5 and layer #7 arranged in SB 2 and SB 3 of SC 1) is multiplexed by, for example, Cyclic Shift (CS) and TD-OCC. Alternatively, the DMRS in different layers arranged in the same REs is multiplexed by CS and Repetition.

Further, in mapping pattern #B, the DMRS in different layers arranged in the same RE (for example, the DMRS in layer #1 and layer #2 arranged in SB 2 of SC 1) is multiplexed by, for example, CS.

Arrangement of the DMRS in layer #1 to layer #4 in SB 2 in mapping pattern #B is similar to arrangement of the DMRS in layer #1 to layer #4 in SB 2 in mapping pattern #A. That is, the arrangement in mapping pattern #B is configured from part of the arrangement in mapping pattern #A, and the arrangement in mapping pattern #A includes the arrangement in mapping pattern #B.

Radio base station 10 allocates layers (port numbers) to each user terminal 20, selects one of mapping pattern #A and mapping pattern #B, and transmits a downlink signal in a mini-slot configuration including the DMRS in the layers (port numbers) allocated to each user terminal 20 on the basis of the selected mapping pattern.

<Second Example in Mini-Slot>

Figure 7:
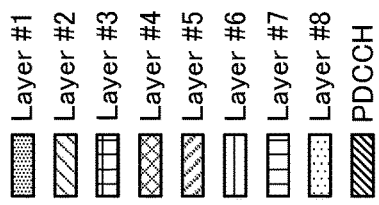
FIG. 7 illustrates mapping patterns in a mini-slot in a second example.
Figure 7:
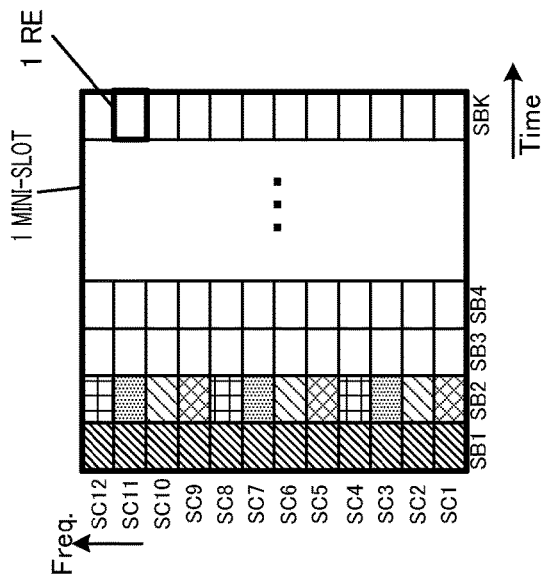
Figure 7:
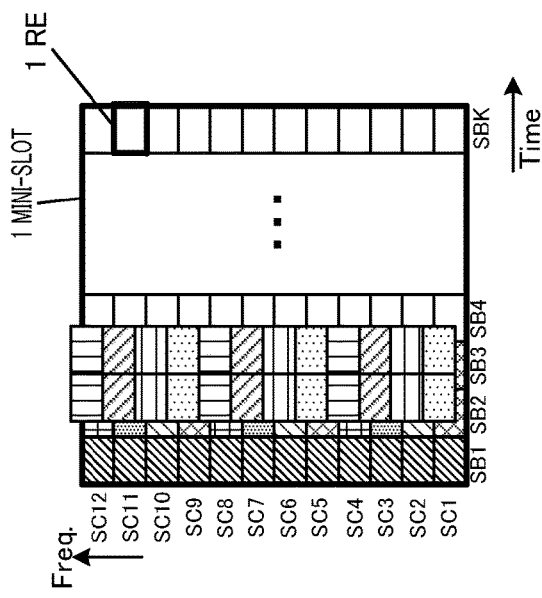

FIG. 7 illustrates mapping patterns in a mini-slot in a second example. FIG. 7 illustrates mapping pattern #C of the DMRS in eight layers and mapping pattern #D of the DMRS in four layers. Each mapping pattern indicates mapping positions of the DMRS in each layer in a mini-slot which is a resource allocation unit.

The mini-slot in FIG. 7 has a configuration in which 12 REs are arranged in the frequency direction, and K REs (where K is an integer equal to or greater than 1 and equal to or less than 14) are arranged in the time direction.

In the RE of the first one symbol (that is, SB 1) of the mini-slot, a control signal channel (for example, a PDCCH) is arranged.

Mapping pattern #C is a pattern in which the DMRS in eight layers of layer #1 to layer #8 is arranged in two successive symbols (SB 2 and SB 3). Mapping pattern #D is a pattern in which the DMRS in four layers of layer #1 to layer #4 is arranged in one symbol (SB 2).

In mapping pattern #C and mapping pattern #D, the DMRS in the same layers is arranged at intervals corresponding to three subcarriers. This arrangement may be referred to as "Comb4" or "IFDM (RPF=4)".

In mapping pattern #C, the DMRS in different layers arranged in the same REs (for example, the DMRS in layer #4 and layer #8 arranged in SB 2 and SB 3 of SC 1) is multiplexed by, for example, CS and Repetition.

Arrangement of the DMRS in layer #1 to layer #4 in SB 2 in mapping pattern #D is similar to arrangement of the DMRS in layer #1 to layer #4 in SB 2 in mapping pattern #C. That is, the arrangement in mapping pattern #D is configured from part of the arrangement in mapping pattern #C, and the arrangement in mapping pattern #C includes the arrangement in mapping pattern #D.

Radio base station 10 allocates layers (port numbers) to each user terminal 20, selects one of mapping pattern #C and mapping pattern #D and transmits a downlink signal in a mini-slot configuration including the DMRS in the layers (port numbers) allocated to each user terminal 20 on the basis of the selected mapping pattern.

<Third Example in Mini-Slot>

Figure 8:
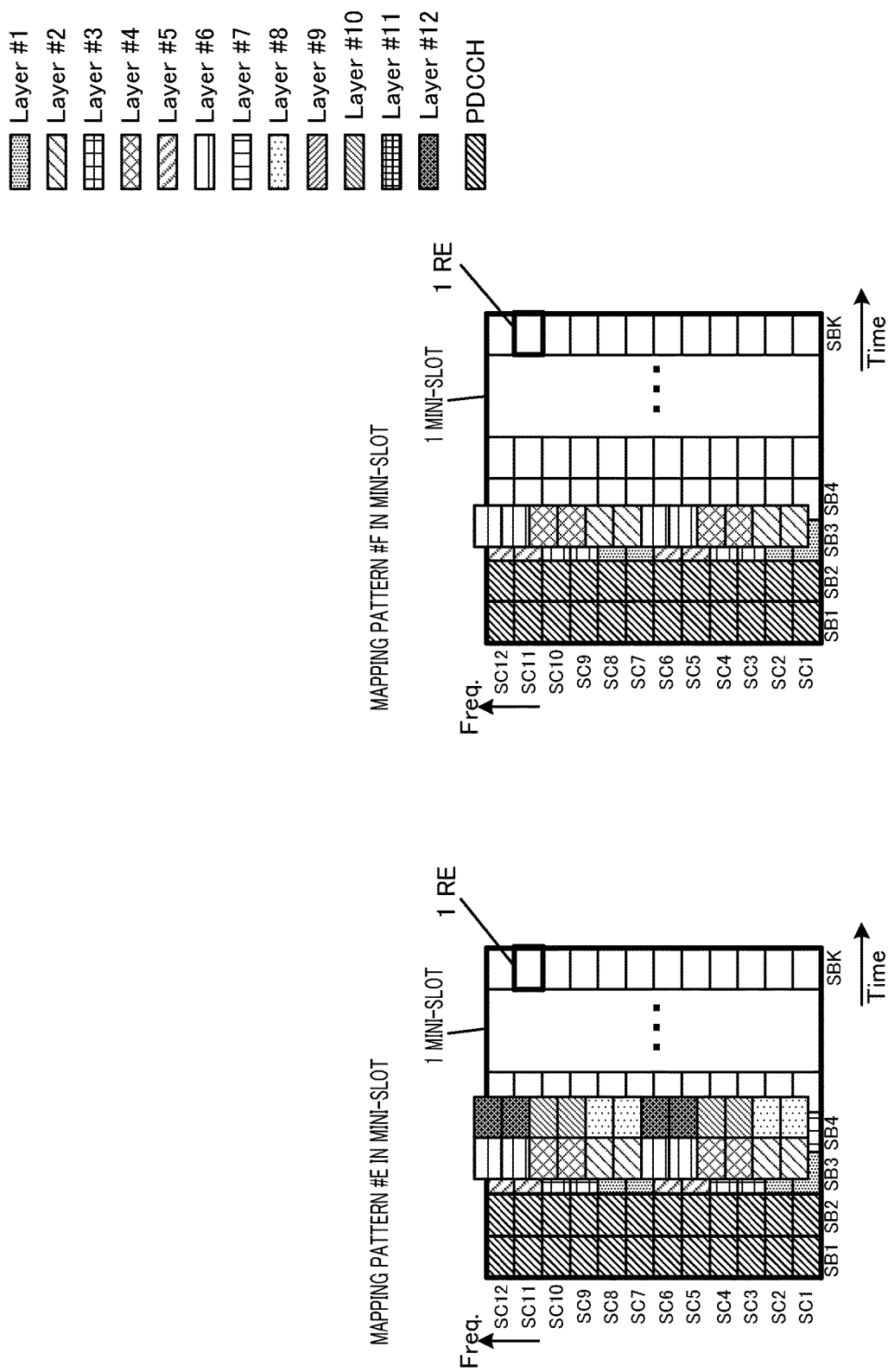
FIG. 8 illustrates mapping patterns in a mini-slot in a third example.

FIG. 8 illustrates mapping patterns in a mini-slot in a third example. FIG. 8 illustrates mapping pattern #E of the DMRS in 12 layers and mapping pattern #F of the DMRS in six layers. Each mapping pattern indicates mapping positions of the DMRS in each layer in a mini-slot which is a resource allocation unit.

The mini-slot in FIG. 8 has a configuration in which 12 REs are arranged in the frequency direction and K REs (where K is an integer equal to or greater than 1 and equal to or less than 14) are arranged in the time direction.

In the REs of the first two symbols (that is, SB 1 and SB 2) in the mini-slot, a control signal channel (for example, a PDCCH) is arranged.

Mapping pattern #E is a pattern in which the DMRS in 12 layers of layer #1 to layer #12 is arranged in two successive symbols (SB 3 and SB 4). Mapping pattern #F is a pattern in which the DMRS in six layers of layer #1 to layer #6 is arranged in one symbol (SB 3).

In mapping pattern #E, the DMRS in different layers arranged in the same REs (for example, the DMRS in layer #1 and layer #2 arranged in SB 3 of SC 1 and SC 2) is multiplexed by, for example, FD-OCC (multiplexing by an OCC sequence in the frequency direction). Then, the DMRS in respective layers is multiplexed by combination of FD-OCC, Frequency Division Multiplexing (FDM) and Time Division Multiplexing (TDM).

In mapping pattern #F, the DMRS in different layers arranged in the same REs (for example, the DMRS in layer #1 and layer #2 arranged in SB 3 of SC 1 and SC 2) is multiplexed by, for example, FD-OCC. Then, the DMRS in the respective layers is multiplexed by combination of FD-OCC and FDM.

Arrangement of the DMRS in layer #1 to layer #6 in SB 3 in mapping pattern #F is similar to arrangement of the DMRS in layer #1 to layer #6 in SB 3 in mapping pattern #E. That is, the arrangement in mapping pattern #F is configured from part of the arrangement in mapping pattern #E, and the arrangement in mapping pattern #E includes the arrangement in mapping pattern #F.

Radio base station 10 allocates layers (port numbers) to each user terminal 20, selects one of mapping pattern #E and mapping pattern #F, and transmits a downlink signal in a mini-slot configuration including the DMRS in the layers (port numbers) allocated to each user terminal 20 on the basis of the selected mapping pattern.

<Fourth Example in Mini-Slot>

Figure 9:
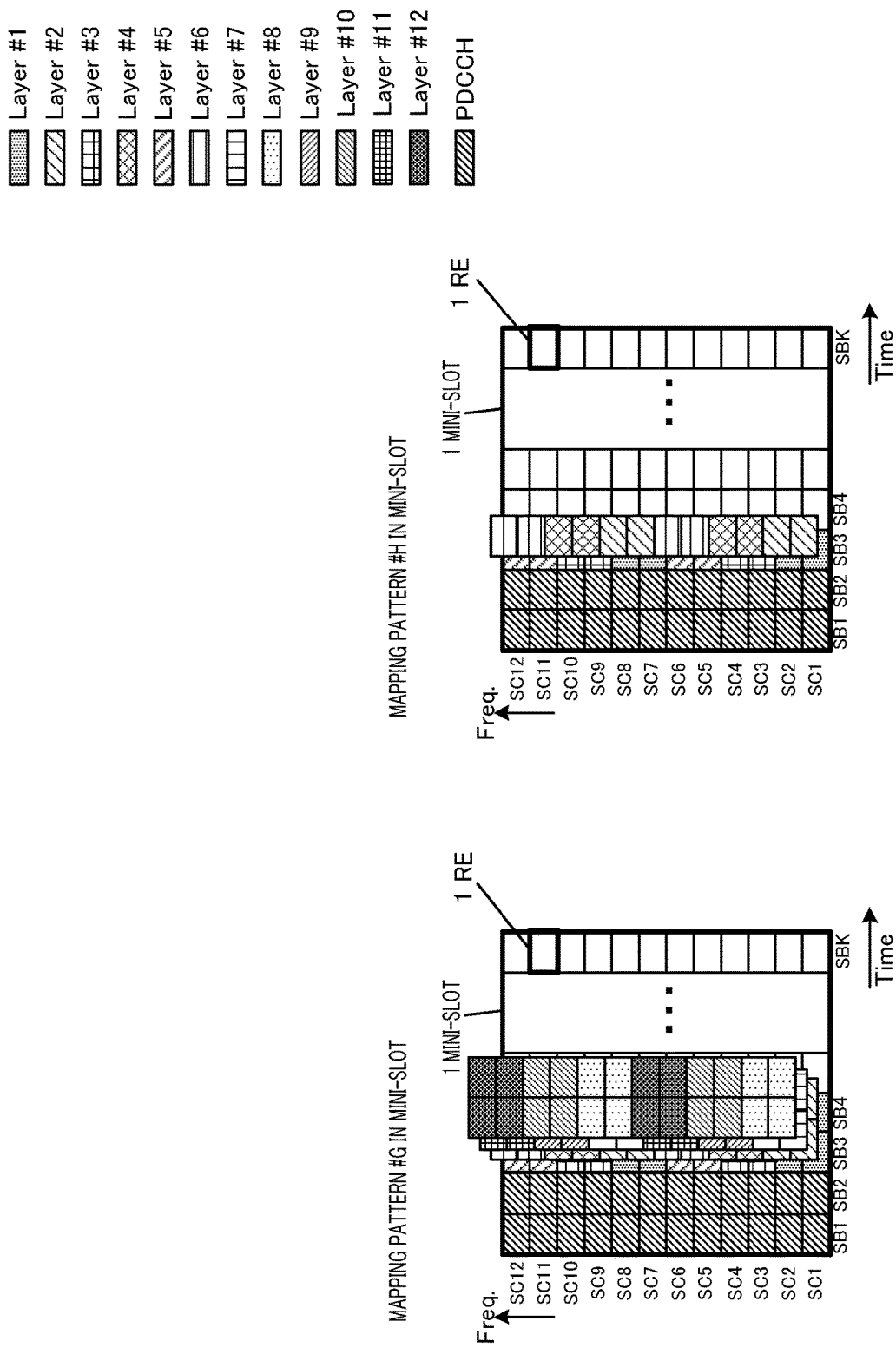
FIG. 9 illustrates mapping patterns in a mini-slot in a fourth example.

FIG. 9 illustrates mapping patterns in a mini-slot in a fourth example. FIG. 9 illustrates mapping pattern #G of the DMRS in 12 layers and mapping pattern #H of the DMRS in six layers. Each mapping pattern indicates mapping positions of the DMRS in each layer in a mini-slot which is a resource allocation unit.

The mini-slot in FIG. 9 has a configuration in which 12 REs are arranged in the frequency direction and K REs (where K is an integer equal to or greater than 1 and equal to or less than 14) are arranged in the time direction.

In the REs of the first two symbols (that is, SB 1 and SB 2) in the mini-slot, a control signal channel (for example, a PDCCH) is arranged.

Mapping pattern #G is a pattern in which the DMRS in 12 layers of layer #1 to layer #12 is arranged in two successive symbols (SB 3 and SB 4). Mapping pattern #H is a pattern in which the DMRS in six layers of layer #1 to layer #6 is arranged in one symbol (SB 3).

In mapping pattern #G, the DMRS in different layers arranged in the same REs (for example, the DMRS in layer #1, layer #2, layer #7 and layer #8 arranged in SB 3 and SB 4 of SC 1 and SC 2) is multiplexed by, for example, FD-OCC and TD-OCC. Then, the DMRS in respective layers is multiplexed by combination of FD-OCC, TD-OCC and FDM.

In mapping pattern #H, the DMRS in different layers arranged in the same REs (for example, the DMRS in layer #1 and layer #2 arranged in SB 3 of SC 1 and SC 2) is multiplexed by, for example, FD-OCC. Then, the DMRS in respective layers is multiplexed by combination of FD-OCC and FDM.

Arrangement of the DMRS in layer #1 to layer #6 in SB 3 in mapping pattern #H is similar to arrangement of the DMRS in layer #1 to layer #6 in SB 3 in mapping pattern #G. That is, the arrangement in mapping pattern #H is configured from part of the arrangement in mapping pattern #G, and the arrangement in mapping pattern #G includes the arrangement in mapping pattern #H.

Radio base station 10 allocates layers (port numbers) to each user terminal 20, selects one of mapping pattern #G and mapping pattern #H, and transmits a downlink signal in a mini-slot configuration including the DMRS in the layers (port numbers) allocated to each user terminal 20.

In the above-described respective examples (the first example to the fourth example) in the mini-slot, in a similar manner to the above-described examples of the resource unit (the first example and the second example), radio base station 10 notifies each user terminal 20 of the pattern information indicating the mapping pattern.

As the pattern information in the case where the resource allocation unit is a mini-slot, any of the first variation to the third variation may be used in a similar manner to the pattern information in a case of the above-described resource unit.

<Effects of Present Embodiment>

In the present embodiment, one mapping pattern is selected by the mapping pattern of the DMRS being switched among a plurality of mapping patterns prepared in advance. Then, by radio base station 10 notifying user terminal 20 of the pattern information indicating the mapping pattern, because user terminal 20 uniquely determines the mapping positions (and/or the number of DMRS) of the DMRS addressed to user terminal 20, so that it is possible to avoid variance between user terminal 20 and radio base station 10, it is possible to appropriately receive a reference signal such as a DMRS and avoid deterioration of channel estimation accuracy.

Note that, while, in the present embodiment, an example has been described where one RU is configured with 14 symbols and 12 subcarriers, the present invention is not limited to this. A size of the RU may be changed.

Further, while, in the present embodiment, an example has been described where a control signal channel (for example, a PDCCH) is arranged in the REs of the first two symbols of the RU (that is, SB 1 and SB 2) and the REs of first one symbol (SB 1) or two symbols (SB 1 and SB 2) of the mini-slot, arrangement of the control signal channel is not limited to this. Further, the control signal channel does not have to be arranged in the RU or may be arranged only in part of the REs.

Further, the number of layers (the number of ports) in the present embodiment is merely an example, and the present invention is not limited to this.

Further, while, in respective examples of the present embodiment, examples where there are two mapping patterns have been mainly described, the present invention is not limited to this. For example, there may be three or more mapping patterns. Further, while examples have been described where, out of two mapping patterns (for example, mapping pattern #1 and mapping pattern #2), arrangement in one mapping pattern (for example, mapping pattern #2) is configured from part of arrangement in the other mapping pattern (for example, mapping pattern #1), the present invention is not limited to this.

Further, while, in the present embodiment, examples have been mainly described where the DMRS is arranged in the third symbol (SB 3) or the fourth symbol (SB 4) of the RU, the present invention is not limited to this. The DMRS may be arranged in the fifth symbol and the subsequent symbols or may be arranged in the second symbol and before the second symbol. Further, the arrangement may be determined in accordance with a size of the control channel.

For example, in addition to the DMRS (for example, a Front-loaded DMRS) arranged on the head side of the RU, an Additional DMRS may be arranged. The Additional DMRS is, for example, a DMRS arranged for improving capability of following temporal fluctuation of a channel in the case where user terminal 20 moves at high speed.

Further, the DMRS to which the present invention is applied is not particularly limited. For example, the present invention may be applied only to the above-described Front loaded DMRS, may be applied only to the Additional DMRS or may be applied to the both.

Further, while, in the above-described embodiment, the DMRS in a downlink signal to be transmitted by radio base station 10 to user terminal 20 has been mainly described using an example, the present invention is not limited to this. The present invention is also applied to the DMRS in an uplink signal to be transmitted by user terminal 20 to radio base station 10. In this case, radio base station 10 configures a layer (reception port number) in which radio base station 10 receives the DMRS and selects a mapping pattern of the DMRS in the uplink signal. Then, radio base station 10, for example, makes a notification of the total number of DMRS reception ports in the selected mapping pattern, the number of reception symbols or the index value as pattern information. By this means, because user terminal 20 can uniquely determine mapping positions (and/or the number of DMRS) of the DMRS to be transmitted by user terminal 20 (that is, to be received by radio base station 10), so that it is possible to avoid variance between user terminal 20 and radio base station 10, radio base station 10 can appropriately receive a reference signal such as the DMRS, so that it is possible to avoid deterioration of channel estimation accuracy.

Further, the RU and/or the mini-slot to which the present invention is applied is not particularly limited. In the case where a wide range of carrier frequencies are supported, the present invention may be applied to RUs and/or mini-slots in all the carrier frequencies, or the present invention may be applied to RUs and/or mini-slots in part of the carrier frequencies.

Each embodiment of the present invention has been described above.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 10:
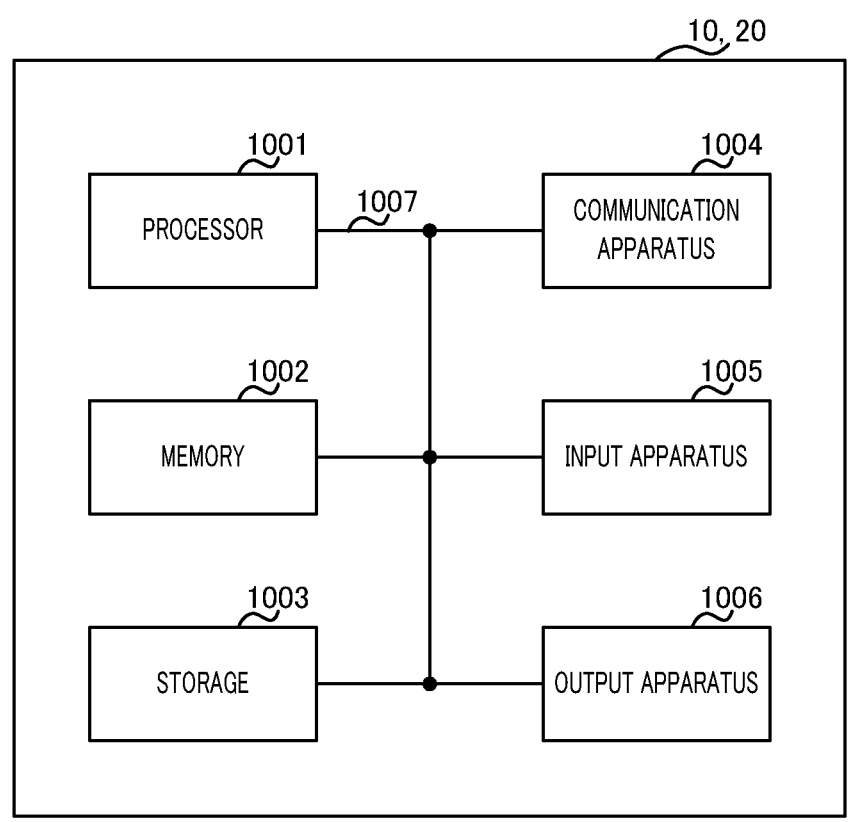
FIG. 10 illustrates an example of a hardware configuration of the radio base station and the user terminal according to one embodiment of the present invention.

For example, the radio base station, the user terminal, and/or the like, according to an embodiment of the present invention may function as computers which perform processing of the radio communication method of the present invention. FIG. 10 illustrates an example of hardware configurations of the radio base station and the user terminal according to an embodiment of the present invention. The above-described radio base station 10 and user terminal 20 may be physically configured as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, the above-described scheduler 101, controllers 108 and 203, transmission signal generators 102 and 206, encoder and modulators 103 and 207, mappers 104 and 208, channel estimators 109 and 204, demodulator and decoders 110 and 205, and/or the like, may be realized with processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitters 105 and 209, antennas 106 and 201, receivers 107 and 202, and/or the like, as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and/or the Like)

The orders of the processing procedures, the sequences, the flow charts, and/or the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and/or the like can be output from a higher layer (or a lower layer) to a lower layer (or a higher layer). The information, the signals, and/or the like may be input and output through a plurality of network nodes.

(Handling of Input and Output Information and/or the Like)

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

("System" and "Network")

The terms "system" and "network" used in the present specification can be interchangeably used.

(Names of Parameters and Channels)

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" can be interchangeably used in the present specification. The base station may be called a fixed station, a NodeB, a gNodeB, an eNodeB (eNB), an access point, a femto cell, a small cell, and/or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. Further, the DMRS may be referred to as different corresponding name, for example, a demodulation RS or a DM-RS, and/or the like.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, and/or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, and/or the like) in the time domain.

The radio frame, the subframe, the slot, the mini-slot, and the symbol indicate time units in transmitting signals. The radio frame, the subframe, the slot, the mini-slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe may be referred to as a TTI, a plurality of successive subframes may be referred to as a TTI, one slot may be referred to as a TTI, or one mini-slot may be referred to as a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini-slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the number of mini-slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and/or the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio base station
20 User terminal
101 Scheduler
102, 206 Transmission signal generator
103, 207 Encoder and modulator
104, 208 Mapper
105, 209 Transmitter
106, 201 Antenna
107, 202 Receiver
108, 203 Controller
109, 204 Channel estimator
110, 205 Demodulator and decoder

The invention claimed is:

1. A terminal, comprising:
   a receiver that receives downlink control information (DCI) including information indicating a mapping pattern of a demodulation reference signal; and
   a processor that controls reception of the demodulation reference signal based on the information indicating the mapping pattern of the demodulation reference signal,
   wherein the mapping pattern of the demodulation reference signal is defined by a number of symbols to which the demodulation reference signal is mapped and a number of groups of the demodulation reference signals to be code multiplexed.

2. The terminal according to claim 1, wherein mapping of the demodulation reference signal corresponding to a number of symbols forming a downlink signal is applied.

3. The terminal according to claim 1, wherein the information is an index corresponding to the number of symbols to which the demodulation reference signal is mapped and the number of groups of the demodulation reference signals to be code multiplexed.

4. A terminal, comprising:
   a receiver that receives downlink control information (DCI) including information indicating a mapping pattern of a demodulation reference signal; and
   a processor that controls transmission of the demodulation reference signal based on the information indicating the mapping pattern of the demodulation reference signal,
   wherein the mapping pattern of the demodulation reference signal is defined by a number of symbols to which the demodulation reference signal is mapped and a number of groups of the demodulation reference signals to be code multiplexed.

5. The terminal according to claim 4, wherein mapping of the demodulation reference signal corresponding to a number of symbols forming an uplink signal is applied.

6. A radio communication method comprising:
   receiving downlink control information (DCI) including information indicating a mapping pattern of a demodulation reference signal; and
   controlling transmission of the demodulation reference signal based on the information indicating the mapping pattern of the demodulation reference signal,
   wherein the mapping pattern of the demodulation reference signal is defined by a number of symbols to which the demodulation reference signal is mapped and a number of groups of the demodulation reference signals to be code multiplexed.

7. A radio communication system, comprising:
   a terminal comprising:
      a receiver that receives downlink control information (DCI) including information indicating a mapping pattern of a demodulation reference signal, and
      a processor that controls reception of the demodulation reference signal based on the information indicating the mapping pattern of the demodulation reference signal; and
   a base station comprising:
      a transmitter that transmits the DCI and transmits the demodulation reference signal, wherein the mapping pattern of the demodulation reference signal is defined by a number of symbols to which the demodulation reference signal is mapped and a number of groups of the demodulation reference signals to be code multiplexed.

* * * * *